United States Patent
Schilling et al.

(10) Patent No.: US 6,904,378 B2
(45) Date of Patent: Jun. 7, 2005

(54) METHOD FOR MEASURING THE TEMPERATURE OF A METAL SAUCEPAN

(75) Inventors: Wilfried Schilling, Kraichtal (DE); Mathias Bellm, Bruchsal (DE)

(73) Assignee: E.G.O. Elektro-Geraetebau GmbH (DE)

(*) Notice: Subject to any disclaimer, the term of this patent is extended or adjusted under 35 U.S.C. 154(b) by 4 days.

(21) Appl. No.: 10/613,404

(22) Filed: Jul. 3, 2003

(65) Prior Publication Data

US 2004/0054486 A1 Mar. 18, 2004

(30) Foreign Application Priority Data

Jul. 5, 2002 (DE) ......................................... 102 31 122

(51) Int. Cl.[7] ................................................. H05B 6/12
(52) U.S. Cl. ........................ 702/99; 702/130; 702/132; 219/460.1; 219/620
(58) Field of Search ........................ 702/99, 130, 132, 702/134, 136, 116, 104, 172; 219/447.1, 460.1, 462.1, 518, 621, 620

(56) References Cited

U.S. PATENT DOCUMENTS

| | | | | | |
|---|---|---|---|---|---|
| 3,887,781 | A | * | 6/1975 | Peters, Jr. ................... | 219/627 |
| 3,973,105 | A | * | 8/1976 | Tsumori ..................... | 219/626 |
| 4,013,859 | A | * | 3/1977 | Peters, Jr. ................... | 219/626 |
| 5,412,171 | A | * | 5/1995 | Yahav et al. ................ | 219/621 |
| 5,424,512 | A | * | 6/1995 | Turetta et al. ........... | 219/447.1 |
| 5,450,305 | A | * | 9/1995 | Boys et al. .................... | 363/24 |
| 5,525,781 | A | * | 6/1996 | Yahav et al. ................ | 219/620 |
| 5,893,996 | A | * | 4/1999 | Gross et al. ............. | 219/447.1 |
| 2002/0011480 | A1 | | 1/2002 | Schilling et al. | |

FOREIGN PATENT DOCUMENTS

| | | |
|---|---|---|
| DE | 44 13 979 A1 | 10/1995 |
| DE | 195 26 091 A1 | 1/1997 |
| DE | 195 40 408 A1 | 5/1997 |
| DE | 196 46 826 A1 | 8/1997 |
| DE | 197 29 661 A1 | 1/1999 |
| EP | 0 658 067 A1 | 6/1995 |

* cited by examiner

*Primary Examiner*—Michael Nghiem
*Assistant Examiner*—Hien Vo
(74) *Attorney, Agent, or Firm*—Akerman Senterfitt

(57) ABSTRACT

A method for measuring the temperature of a cooking vessel or saucepan using a radiant heater. The radiant heater has a heating coil with a corresponding control and an induction coil as an inductive sensor and which is located in a metal tray. With the inductive sensor, measurement takes place of the frequency of the inductive resonant circuit comprising saucepan, heating coil, induction coil and metal tray, which is dependent on the temperature of the components. In the control is stored known slopes or paths of the temperature and therefore the frequency of the metal tray over the time. From this the control gathers correction values in order to produce from the measured curve a compensated curve. At characteristic points, such as the start of a cooking or boiling process or an empty cooking or boiling of the saucepan, it is possible to detect the temperatures.

26 Claims, 2 Drawing Sheets

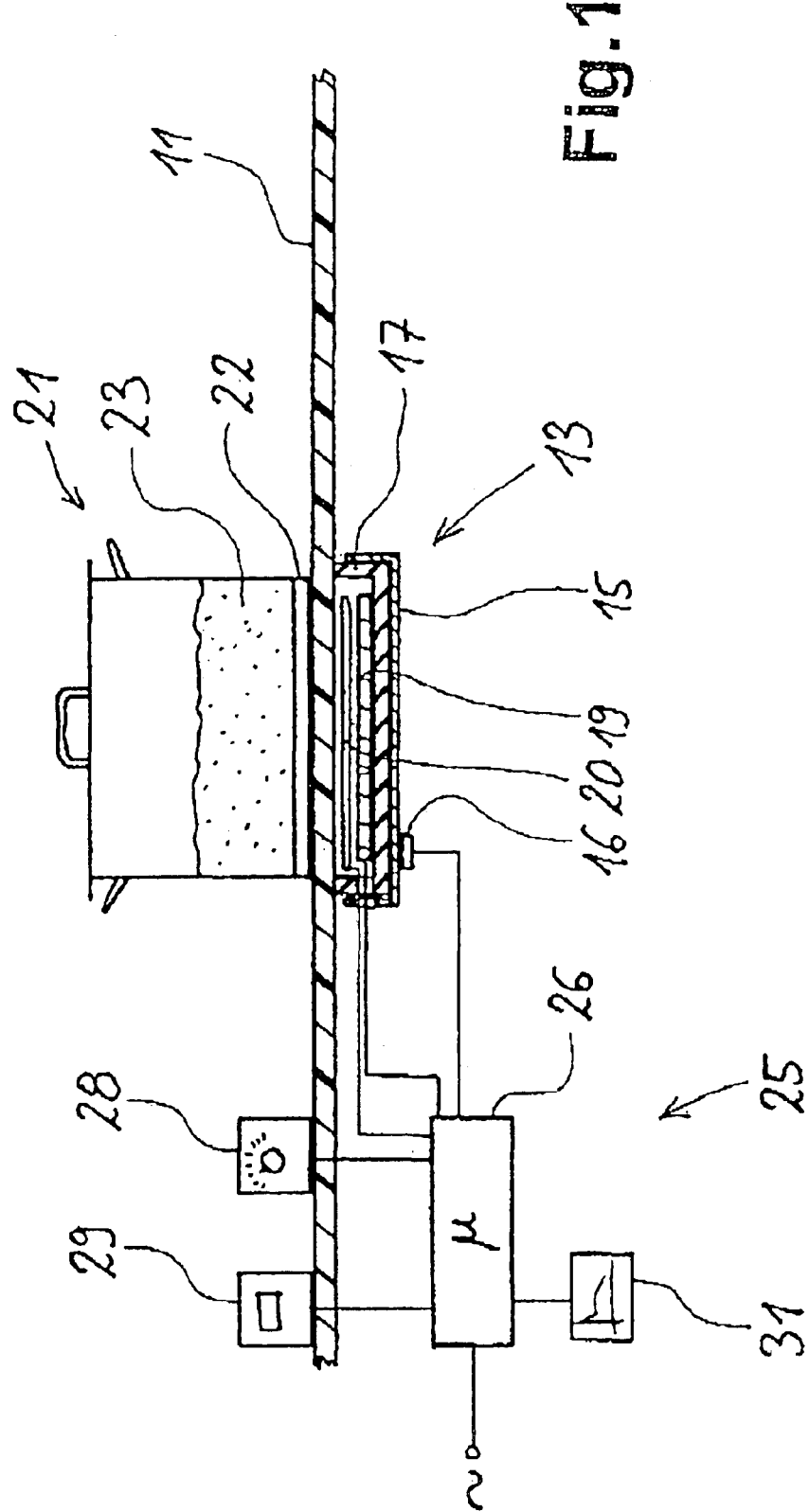

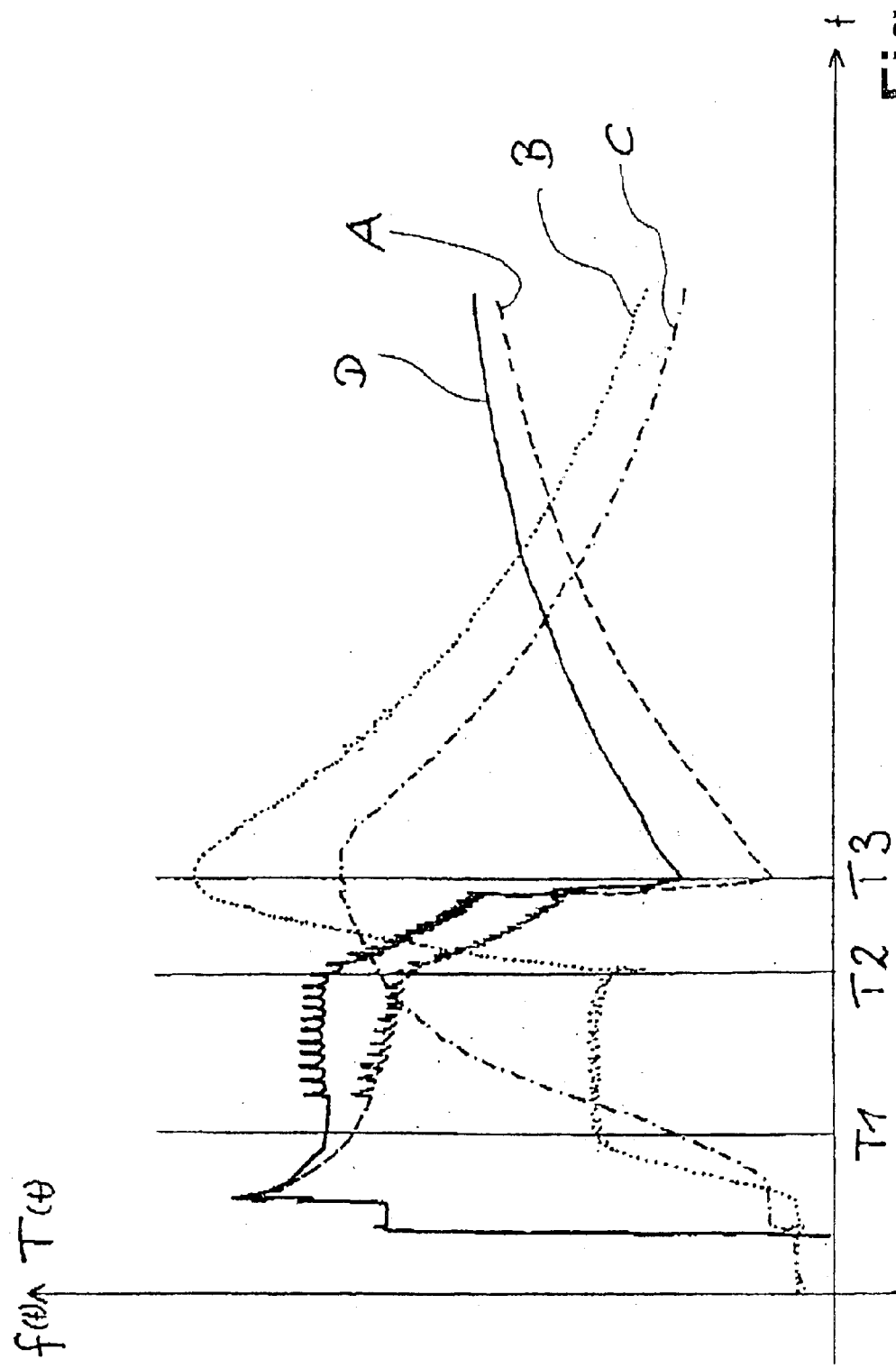

METHOD FOR MEASURING THE TEMPERATURE OF A METAL SAUCEPAN

FIELD OF APPLICATION AND PRIOR ART

The invention relates to a method for measuring the temperature of a metal cooking vessel or saucepan in the vicinity of a heater and to an electrical heating device with temperature measurement.

Methods and heaters provided with suitable devices for measuring the temperature of a metal saucepan are known in numerous different forms. In order to measure the temperature of a saucepan in non-contacting manner and to derive a temperature control therefrom, an attempt has e.g. been made to form a resonant circuit from an induction coil together with the metal saucepan bottom. This e.g. makes it possible to establish the resonant circuit frequency of the saucepan bottom. The latter is in turn determined by the temperature-dependent permeability of the saucepan bottom material. Therefore conclusions can be drawn concerning its temperature from the behaviour of the saucepan bottom. However, for this it is necessary to calibrate in complicated manner the system in order to provide relatively accurate temperature information and this is looked upon as disadvantageous.

PROBLEM AND SOLUTION

The problem of the invention is to provide an aforementioned method and a heating device with which it is possible to avoid the disadvantages of the prior art and in particular obviate a complicated, fault-prone setting of inductive temperature detection systems.

This problem is solved by a method with the features of claim 1 and a heating device hawithving the features of claim 19. Advantageous and preferred developments of the invention form the subject matter of further claims and will be explained in greater detail hereinafter. By express reference the wording of the claims is made into part of the content of the description.

According to the invention, in said method, an inductive sensor and evaluation electronics are provided for detecting and controlling the saucepan temperature. The inductive sensor and metal saucepan are part of a resonant circuit, so that a resonant circuit parameter is measured. The resonant circuit parameter can e.g. be the frequency or a phase angle, or alternatively damping or conductance. The time behaviour or slope of the resonant circuit parameter is detected. The invention has specifically shown that during certain segments of a conventional cooking or boiling process, particularly the initial boiling of the water or liquid in the saucepan, the saucepan or saucepan bottom temperature undergoes no further significant change. In a normal cooking vessel or saucepan boiling water cannot assume a temperature higher than 100° C. This point at which the saucepan temperature and therefore also the measured resonant circuit parameter such as e.g. the frequency undergoes no further significant change, is detected as the characteristic segment. In particular there is a pronounced change to the gradient of the slope. From said characteristic segment is in turn determined the temperature, e.g. during the initial boiling process of water, as a temperature of approximately 100° C.

According to the invention, in addition to such an eventive establishment of a relative change to the slope or the measured value, the absolute value of the latter can be used at a specific point of the characteristic segment as a desired value for the control. Thus, very easily and without any complicated adjustment, it is possible to obtain a desired value for a temperature control.

As is often conventionally the case, the heater has a metal or ferromagnetic support or carrier. The latter heats during the heating operation, so that there are also changes to its permeability and resonant circuit behaviour. As it is part of the inductive resonant circuit, the support additionally forms a varying, interfering influence for the resonant circuit and therefore the resonant circuit parameter or temperature detection. According to the invention the support temperature is measured and processed to a correction value. The measured resonant circuit parameter is then corrected with said correction value in such a way that the support no longer has an interfering influence.

In this way it is possible to reduce further influences of the heating process, e.g. the heating of further devices or components. Thus, by a similar detection and production, as well as the use of correction values, interference and more significant measurement inaccuracies can be avoided.

Advantageously a gradient reduction is used as the change to the measured value slope gradient. This can be the transition to a substantially constant measured value, which corresponds to a roughly constant saucepan temperature.

According to the invention, it has been found that in the case of a complete evaporation of the water or some other liquid in the saucepan, a further temperature rise can be detected. This indicates a further change to the frequency and therefore the measured value. This can be detected as a further or second characteristic segment of the slope. As it is generally a state which is to act on the temperature control or heater, it can be used as a signal for switching off the heater.

The correction values can be stored. This can take place in conjunction with the temperature of the support, the time or the coupling in of energy. The storage of correction values can take place in the form of curves or the corresponding values. The correction values can so to speak be stored as sets of curves with specific parameters. This can e.g. take place as a function of a specific coupling in of energy over a certain time period.

The temperature can be measured by a resistance measuring sensor, which can also be dependent on specific applications. A temperature measurement and determination of the correction value preferably takes place repeatedly and in particular continuously.

For processing the temperature or temperature change of the support to a correction value it is possible to provide a control means, which advantageously has a microprocessor. A memory can also be provided for the correction values. From the support temperature is then calculated by means of the known correction values a resonant circuit parameter or frequency shift, e.g. by simply taking a frequency value corresponding to a measured temperature. The frequency shift is then applied to the measured resonant circuit frequency.

Advantageously the inductive sensor is constituted by a coil. In an embodiment of the invention the coil can be a saucepan detection coil. Advantageously the coil has a few turns. In particularly advantageous manner the coil has only one turn, which makes it possible to reduce the costs of manufacture and retention of such a coil. As an alternative to a coil with at least one turn, it is possible to use a straight, inductive sensor or so-called linear sensor.

According to a further development of the invention, advantageous methods can be used in an induction heater with an induction coil. Advantageously the induction coil is used as the temperature measurement sensor. Preferably this takes place in a type of timed or alternating operation with the heating function of the induction coil. Thus, by means of the induction coil and in time-segmental manner on the one hand the saucepan is heated and on the other the resonant circuit parameter is detected or the temperature is measured.

Advantageously the induction coil can have an electric contacting means in its path on a turn or the like. The contacting means should geometrically be located in an area of the induction coil in which the temperature measurement of the saucepan is to take place or where the latter is located. The electrical contacting means makes it possible to subdivide the induction coil into at least two regions. One part or region of the induction coil is used for temperature measurement purposes. Therefore there is no need to control and operate all the induction coil as an inductive sensor, which is advantageous.

In many cases induction coils advantageously have a spiral construction. It is possible within the scope of the invention to divide off an inner part of the induction coil through such an electrical contacting means. Said inner part is then operated as an inductive sensor.

It is also possible to short-circuit the other part of the coil not used as a sensor. It consequently has no interfering effect during sensor operation. In order to keep low the current flowing through the sensor, the latter can be operated with a raised frequency.

An electrical heating device with a temperature measurement according to the invention has a heater, an inductive sensor and evaluation electronics for controlling the temperature. In particularly preferred manner it is a hot point of a cooking area with which it is possible to heat a cooking vessel or saucepan placed thereon. The inductive sensor and a metal saucepan to be heated with the heating device form part of a resonant circuit. Thus, by means of the sensor, its resonant circuit parameter or e.g. the saucepan frequency can be determined. The evaluation electronics are constructed for detecting the resonant circuit parameter as a measured value over its time slope or behaviour and to determine from a characteristic segment of the curve, in the manner described hereinbefore, the temperature of the saucepan. The evaluation electronics are also constructed for taking an absolute value at a specific point of the characteristic segment of the measured value curve and to use same as a desired value for the control. A temperature sensor is provided with which it is possible to measure the temperature of the support in which the heater is located and from this is then produced the correction value.

In an embodiment of the invention, it is possible to use an induction heater with an induction coil, which forms the sensor. It is advantageously possible to provide on the induction coil an electrical contacting means through which the induction coil can be subdivided into at least one first part and a second part. One part of the induction coil can be constructed for temperature measurement. It is also advantageously possible for the induction coil to have a spiral construction. An inner part of the coil can be isolated with an electrical contacting means and constructed for temperature measurement purposes. For this purpose it is connectable or connected to the evaluation electronics for control purposes. Another part of the induction coil, i.e. the remaining induction coil, can be short-circuited.

These and further features can be gathered from the claims, description and drawings and the individual features, both singly or in the form of subcombinations, can be implemented in an embodiment of the invention and in other fields and can represent advantageous, independently protectable constructions for which protection is claimed here. The subdivision of the application by subheadings and into individual sections in no way limits the general validity of the statements made thereunder.

BRIEF DESCRIPTION OF THE DRAWINGS

The invention is described in greater detail hereinafter relative to embodiments and the attached drawings, wherein show:

FIG. 1 A diagrammatic representation of a radiant heater of a glass ceramic cooking area with inductive sensor and control means.

FIG. 2 Different frequency and temperature curves in the time behaviour.

DETAILED DESCRIPTION OF THE EMBODIMENT

The diagrammatic FIG. 1 shows a glass ceramic cooking area 11. Below a hot point of the glass ceramic cooking area 11 is located a radiant heater 13, which is in principle constructed in known manner. In a sheet metal dish or tray 15 is inserted a flat, also dish or tray-shaped insulator 17, on which is located a heating coil 19. It is also possible to embed a heating coil 19 in the insulator 17. From below the radiant heater 13 is pressed onto the underside of the glass ceramic cooking area 11, which can e.g. take place by not shown retaining means.

Directly above the heating coil 19 is provided an induction coil 20 which, as described, can have a differing construction and can e.g. have a single turn.

Above the radiant heater 13 a cooking vessel or saucepan 21 is placed on the glass ceramic cooking area 11. By means of the radiant heater 13 energy is coupled into the saucepan bottom 22, which for this purpose has a ferromagnetic construction. As a result of the heat in the saucepan bottom 22, water 23 is boiled. With said device or also the subsequently described method, the aim is to detect when the water 23 in the interior of the saucepan 21 starts to boil.

The radiant heater 13 or heating coil 19 is connected to a control means 25, which has a microprocessor 26. There is also an operating element 28 and a display 29, which are also connected to the microprocessor 26. The operating element 28 and display 29 can be constructed in a conventional manner.

The control means 25 also has a memory 31 connected to the microprocessor 26. In the exemplified representation the control means 25 and microprocessor are responsible for the energy supply to the heating coil 25. For this purpose it is e.g. possible to provide power switches or the like.

The temperature of the metal dish or tray 15 is measured directly and for this purpose a temperature sensor 16 is applied to the underside thereof. The location for applying or fitting the temperature sensor can vary, but should be selected in such a way that it is located at a very representative point. The temperature sensor 16 can e.g. be a resistance measuring sensor. It is connected to the control means 25 or the microprocessor 26 in order to obtain the temperature of the metal tray during the evaluation of the curves.

In accordance with the above-described method according to the invention for the measurement of the temperature of the saucepan 21, the induction coil 20 is controlled by the control means 25 in addition to the inductive heating operation as an inductive sensor. It is obviously possible here to use an induction coil of an induction heater. This could e.g.

be alternatively controlled as a heater and as an inductive sensor. Such an alternate control of the induction coil as an inductive heater and inductive sensor is known per se.

The induction coil 20 forms part of an inductive resonant circuit into which are bound the saucepan bottom 22 and metal tray 15. The metal tray 15 and saucepan bottom 22 have a temperature-dependent permeability and therefore inductance, which influences the inductive resonant circuit and can be detected via the induction coil 20. The method according to the invention is inter alia based on the fact that as a result of the inductance change inter alia of the saucepan bottom 22 as a function of the temperature conclusions can be drawn regarding the temperature.

FIG. 2 plots over the time t different curves for the frequency F and the temperature T, although no part is played by said times. For illustration purposes it can be said that the curves roughly extend up to a time of 60 minutes. However, this is merely of an exemplified nature and is used for illustration purposes. The frequencies are also variable. The frequencies shown here are in the range of roughly 3.3 MHz. However, this is also solely for illustration and can vary widely. The temperature curves have a type of saddle point at 100° C. and further information on this will be given hereinafter.

It is possible to see a broken line curve A, which is an uncompensated frequency curve for the entire resonant circuit over time and comprises induction coil 20, saucepan bottom 22 and metal tray 15, as well as the heating coil 19.

The dotted line curve B represents the path of the temperature T over time t solely for the saucepan 21. Account is not taken here of the influence of the metal tray 15. This curve is as if it were determined with a separate temperature measuring device.

In simple manner the dot-dash line curve C represents the path of the temperature T over time t for the metal tray in isolated form. The shallow and highly time-delayed temperature rise of the metal tray 15 is due to the fact that the heat migrates only relatively slowly through the insulator 17 into the metal tray 15.

Curve D is a compensated version of curve A after removing the influence exerted by metal tray 15. By means of the frequency curve D, it is possible to determine the temperature of the saucepan 21.

A time T1 is also shown and indicates the time behaviour at the start of boiling of the water 23. This boiling start means that the temperature of the saucepan 21 or saucepan bottom 22 undergoes no further change and is instead roughly constantly 100° C.

In the time behaviour, the next time T2 indicates the point where, either by normal heating or by boiling, the water 23 in saucepan 21 has completely evaporated. As from this time there can again be a temperature rise and therefore a further change to the frequency f. At time T3 heater 13 has been switched off and the temperatures then drop.

For illustrating the curve A it can be stated that it admittedly has a certain kink roughly at time T1. However, this is not very pronounced and is scarcely sufficient for the unambiguous determination of the start of boiling of water 23. At time T2, where the water 23 has disappeared, the temperature of the saucepan bottom 22 rises again, i.e. the frequency again drops. The absolute low point of the curve A shortly thereafter is unimportant for the control means or the method described here. The point at T1 can be used as the control point for a temperature control to 100 øC.

The small peaks in curves A and D before and after T2 indicate how the radiant heater 13 heats in timed manner. The peaks indicate the timing cycle. They more particularly arise through the fact that the heating coil 19 is made from metal and therefore its temperature and consequently also its permeability changes during the timed heating processes.

In connection with curve B it is clear that the temperature of the saucepan 21 does not change between T1 and T2. The temperature only rises again as a result of the empty boiling of the saucepan as from T2.

In curve C of metal tray 15 there is obviously no influence of the empty boiling of saucepan 21. It can be clearly gathered from this that between times T1 and T2 the metal tray temperature slowly, but continuously rises and reaches its maximum value well after T2. This continuous rise of the temperature of the metal tray 15, more particularly between times T1 and T2, is the reason why, without a compensation of this influence, curve A has the represented configuration and is not suitable or gives rise to errors with respect to a precise temperature evaluation.

Curve B would be the ideal temperature evaluation curve. However, as it is unavoidable that the metal tray 15 is in the inductive resonant circuit and therefore influences the measured curve A, it is necessary to take account of the influence of the metal tray 15 with the temperature according to curve C.

Thus, with respect to the method according to the invention, it can be said that the curve A is detected by the inductive sensor 19. The per se known curve C, e.g. detected once in a reference measuring method for a specific metal tray 15 and which can then be stored in the memory 31, is used as a correction value and set off against curve A in known manner. As a result curve D is obtained which, as is shown in FIG. 2, detects relatively well the changes to the paths at times T1 and T2 and corresponding evaluation thereof is possible by a control means.

It is possible to file the curve C in control means 25 for implementing the method. Through the detection of the temperature of the metal tray 15 by means of temperature sensor 16, at any time the control means 25 can determine the actual point of curve C. Finally, the frequency and temperature of the metal tray 15 are linked by means of the physical circumstances. Thus, at any time the control means can gather from the curve C the necessary correction values for correcting curve A. As a result of this correction control means 25 obtains curve D. As described hereinbefore, it is possible to precisely determine therefrom both times T1 and T2. This makes it possible to detect a starting boiling process and also a running empty of a saucepan 21.

Advantageously the curves are stored in the factory in memory 31. Thus, this process does not have to be separately performed for each individual inductive heater 13. It is also possible to store links with a coupling in of energy via the heater in order to economize the measurement of the temperature of the metal tray and the associated costs.

The invention is based on the fact that the distance between the metal tray 15 and heating coil 19 is predetermined by design and is therefore always the same. Thus, the influence of the metal tray on the measured frequency of curve A determined as a result of the measured tray temperature can be detected, determined and filed. This influence can also be subsequently calculated by correction from curve A and as a result curve B is obtained.

Instead of measuring the temperature of the metal tray 15 by a temperature sensor 16, it is also possible to file various curves in accordance with curve C. Through the determination of the cooking energy or heating power coupled in by means of the induction coil 19, which is readily possible in control means 25 or microprocessor 26, it is possible to establish the temperature of the metal tray 15 after coupling in a specific energy over a specific time or with a specific time profile.

As it is fundamentally possible that not only by boiling, but also by normal heating all the water 23 disappears from the saucepan 21, it is fundamentally also possible to determine no point corresponding to T1. Finally, the saucepan 21 does not necessarily remain at a specific temperature. However, it is always possible to establish T2, at which there is once again a rapid heating and therefore a pronounced change to the gradient of the compensated curve D.

It is possible to associate a specific initial temperature, e.g. ambient temperature to a filled saucepan 21. Additionally through reaching the cooking point T1 the frequency f can be determined at which the saucepan 21 would relatively accurately be at 100° C. Finally, for certain processes, e.g. a keeping hot of a saucepan content, it is possible to start with a temperature lower than 100° C., e.g. 70° C. or 80° C. By interpolating the curve between the known starting temperature and 100 !C, the frequency belonging to the desired temperature can be determined. The control means 25 can then control the coupling in of energy across the heating coil 19 in such a way that this frequency and therefore the desired temperature are maintained.

The initial temperature for such a procedure can e.g. be inputted by means of control element 28 or the like. It can alternatively be assumed that on putting into place a saucepan 21 with its content always roughly has ambient temperature.

What is claimed is:

1. A method for measuring the temperature of a ferromagnetic saucepan for detecting and controlling the temperature of the saucepan, said ferromagnetic saucepan being located near a heater, said heater, said heater having a suport made from ferromagnetic metal, wherein an inductive sensor and a control means with evaluation electronics are provided for controlling said heater and the temperature of said saucepan, said inductive sensor and said ferromagnetic saucepan forming part of a resonant circuit, the method comprising the steps of:

determining a parameter of said resonant circuit is on said inductive sensor as a measured temperature value in time behavior with a curve, establishing from a characteristic segment of said curve the temperature of said saucepan;

using the absolute value of said measured temperature value at a specific point of said characteristic segment as a desired value for control purposes;

measuring the temperature of said support and using the temperature for forming a correction value; and correcting said resonant circuit parameter using said correction value.

2. A method according to claim 1, wherein a frequency of said resonant circuit is used as said resonant circuit parameter.

3. A method according to claim 1, wherein a phase angle in said resonant circuit is used as said resonant circuit parameter.

4. A method according to claim 1, wherein said characteristic segment is a relatively rapid gradient change.

5. A method according to claim 4, wherein when said gradient changes, said gradient becomes more shallow.

6. A method according to claim 1, wherein a boiling point of water in the saucepan is used as said temperature or said desired value.

7. A method according to claim 1, wherein there is liquid in said saucepan, and when all said liquid in said saucepan is evaporated, a further temperature rise is detected by a second characteristic segment of said measured value curve.

8. A method according to claim 1, wherein said correction values are stored in conjunction with said temperature of said support, said time or a measure coupling in of energy via said heater.

9. A method according to claim 1, wherein said temperature measurement and determination of said correction value take place repeatedly.

10. A method according to claim 1, wherein said temperature is measured by a resistance measuring sensor.

11. A method according to claim 1, wherein from said temperature of said support is calculated a frequency shift of said resonant circuit parameter.

12. A method according to claim 12, wherein said inductive sensor is a coil.

13. A method according to claim 12, wherein there is provided a saucepan detection coil, and said saucepan detection coil is used as sensor.

14. A method according to claim 13, wherein said saucepan detection coil has only one turn.

15. A method according to claim 1, wherein in the case or an inductive heater with an induction coil, said induction coil is used as sensor.

16. A method according to claim 15, wherein said induction coil is provided with an electrical contacting means in an area where said temperature measurement takes place, and through said electrical contacting means there is a subdivision of said induction coil into at least two areas, one part of said induction coil being used for temperature measurement purposes.

17. A method according to claim 16, wherein in the case of a spiral induction coil, an inner part of said coil is used for temperature measurement.

18. A method according to claim 17, wherein another part of said coil is short-circuited, and an inner part of said coil is operated with an increased frequency as sensor.

19. An electrical heating device with temperature measurement, for a hot plate of a cooking area for a metal saucepan, comprising:

a heater for said saucepan, said heater being located on a ferromagnetic support an inductive sensor and evaluation electronics for controlling said saucepan temperature, wherein said inductive sensor, support and saucepan form part of a resonant circuit; and a temperature sensor is for measuring a support temperature wherein said evaluation electronics are constructed for:

detecting a resonant circuit parameter of said inductive sensor as a measured value in time behavior as a curve, and for determining said temperature from a characteristic segment of said curve, using of an absolute value of said measured value at a specific point of the characteristic segment of said curve as a desired value for a control, processing a temperature of said support to a correction value and correcting said measured resonant circuit parameter with said correction value.

20. Heating device according to claim 19, wherein said frequency is used as said resonant circuit parameter.

21. Heating device according to claim 19, wherein said inductive sensor is a saucepan detection coil for detecting a metal saucepan in the vicinity of said heater.

22. Heating device according to claim 19, wherein said heater is an induction heater with an induction coil, and said induction coil is constructed as sensor.

23. Heating device according to claim 14, wherein said induction coil has an electrical contacting means for subdividing said induction coil into at least a first part and a second part, wherein part of said induction coil is constructed for temperature measurement purposes.

24. Heating device according to claim 23, wherein in the case of a spiral induction coil, an inner part of said coil is constructed for temperature measurement and is connectable to said evaluation electronics and another part of said coil is constructed for being short-circuited.

25. Heating device according to claim 19, wherein said support is a reception tray made from ferromagnetic material, said heater being located in said reception tray.

26. A method for measuring the temperature of a ferromagnetic saucepan, the ferromagnetic saucepan being located near a heater, the heater having a support made from ferromagnetic metal, wherein an inductive sensor and a control means with evaluation electronics are provided for controlling the heater and the temperature of the saucepan, in which the inductive sensor and the ferromagnetic saucepan form part of a resonant circuit, the method comprising the step of:

determining a parameter of the resonant circuit on the inductive sensor as a measured temperature value in time behavior with a curve;

establishing from a characteristic segment of the curve the temperature of the saucepan;

using the absolute value of the measured temperature value at a specific point of the characteristic segment as a desired value for control purposes;

measuring the temperature of the support and using the temperature for forming a correction value; and using the correction value for correcting the resonant circuit parameter, wherein the temperature measurement and determination of the correction value take place repeatedly.

* * * * *